(12) United States Patent
Marconnet

(10) Patent No.: US 11,928,977 B2
(45) Date of Patent: Mar. 12, 2024

(54) SYSTEM AND METHOD FOR ASSISTING IN THE LANDING OF AN AIRCRAFT

(71) Applicant: Airbus Operations SAS, Toulouse (FR)

(72) Inventor: Nicolas Marconnet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 215 days.

(21) Appl. No.: 17/515,952

(22) Filed: Nov. 1, 2021

(65) Prior Publication Data

US 2022/0139240 A1 May 5, 2022

(30) Foreign Application Priority Data

Nov. 5, 2020 (FR) ....................................... 2011365

(51) Int. Cl.
*G08G 5/02* (2006.01)
*G05D 1/00* (2006.01)
*G08G 5/00* (2006.01)

(52) U.S. Cl.
CPC ........... *G08G 5/025* (2013.01); *G05D 1/0676* (2013.01); *G08G 5/0013* (2013.01)

(58) Field of Classification Search
CPC ...... G01C 25/00; G01C 23/00; G01C 23/005; G01C 21/20; G05D 1/04; G05D 1/0676;
(Continued)

(56) References Cited

U.S. PATENT DOCUMENTS 6,178,363 B1 * 1/2001 McIntyre ................ G01S 19/52
701/16
7,546,183 B1 6/2009 Marcum
(Continued)

FOREIGN PATENT DOCUMENTS

EP 2947534 A2 11/2015
FR 3016222 A1 7/2015

OTHER PUBLICATIONS

Groves, Paul D. Principles of GNSS, Inertial, and Multi-Sensor Integrated Navigation Systems. Boston: Artech House, 2007. Print. (Year: 2007).*
(Continued)

*Primary Examiner* — Jaime Figueroa
*Assistant Examiner* — Benjamin J Brosh
(74) *Attorney, Agent, or Firm* — Greer, Burns & Crain, Ltd.

(57) ABSTRACT

A system for assisting in the landing of an aircraft including a processing unit configured to: during a first phase of a landing runway approach procedure, when the aircraft flies above a predetermined height with respect to a landing runway threshold, determine a bias of position and speed information from an inertia unit of the aircraft, as a function of the merged position and speed information determined as a function of information from a receiver of ILS guidance signals and of information from a signal receiver of a satellite navigation system, then, during a second phase of the approach procedure, when the aircraft flies below the predetermined height, determine so-called adjusted aircraft position and speed information by applying, to information from the inertial unit, a correction corresponding to the bias determined during the first phase of the approach procedure.

12 Claims, 2 Drawing Sheets

(58) Field of Classification Search
CPC ........ G05D 1/101; G05D 1/0088; G05D 1/06; G08G 5/025; G08G 5/0013; G08G 5/02; G08G 5/0086; B64D 45/04
See application file for complete search history.

(56) References Cited

U.S. PATENT DOCUMENTS

| | | | | |
|---|---|---|---|---|
| 7,690,603 | B2* | 4/2010 | Peyrucain | G01S 5/018 |
| | | | | 701/16 |
| 8,160,758 | B2* | 4/2012 | Call | G01S 7/4004 |
| | | | | 701/301 |
| 8,958,932 | B2* | 2/2015 | Murphy | B64D 45/04 |
| | | | | 701/16 |
| 10,203,693 | B2* | 2/2019 | McLees | G01C 21/1652 |
| 2008/0255715 | A1* | 10/2008 | Elchynski | G01S 19/15 |
| | | | | 701/16 |
| 2015/0203214 | A1 | 7/2015 | Bourret et al. | |

OTHER PUBLICATIONS

Thales Group, Webpage May 29, 2016, Multi-Mode Receiver—MMR, https://www.thalesgroup.com/en/multi-mode-receiver-mmr (Year: 2016).*

Algebra.com, Webpage Oct. 4, 2015, Solution: An aeroplane, coming in to land, passes over a point 1km away from its landing place on level ground. https://www.algebra.com/algebra/homework/Pythagorean-theorem/Pythagorean-theorem.faq.question.854235.html (Year: 2015).*

* cited by examiner

SYSTEM AND METHOD FOR ASSISTING IN THE LANDING OF AN AIRCRAFT

CROSS-REFERENCES TO RELATED APPLICATIONS

This application claims the benefit of the French patent application No. 2011365 filed on Nov. 5, 2020, the entire disclosures of which are incorporated herein by way of reference.

FIELD OF THE INVENTION

The invention relates to the field of the navigation and control systems of an aircraft used during an approach to a landing runway by the aircraft.

BACKGROUND OF THE INVENTION

One or more predetermined approaches are generally published for each landing runway of an airport. For a predetermined approach of an airport, the published information generally comprise at least: an orientation of the landing runway, a slope and an orientation of a landing runway approach axis and a decision height below which the landing runway should be visible to a pilot of the aircraft to be able to land on the landing runway. Many landing runways are equipped with transmitting beacons of an instrument landing system called ILS. These beacons generally correspond to a beacon transmitting a lateral guidance system, called "Loc," and a beacon transmitting a vertical guidance signal, called "Glide." The signals transmitted by these beacons allow an aircraft equipped with ILS signal receivers to follow an approach axis of the landing runway that corresponds substantially to the approach axis published for that landing runway. There are several instrument approach categories, based notably on the accuracy of the ILS beacons with which the landing runway is equipped, the profile of the terrain upstream of the landing runway and the accuracy of the ILS signal receivers embedded onboard the aircraft. The most common category is category 1 (cat I) for which the decision height is generally 200 ft (approximately 60 meters), with the required visibility of the landing runway of at least 550 m. For category 2 (cat II), the decision height is 100 ft (approximately 30 m) with a required visibility of the landing runway of at least 300 m. For category 3A (cat IIIA), the decision height is 50 ft (approximately 15 m), with a required visibility of the landing runway of at least 175 m. For category 3B (cat IIIB), the decision height is zero, with a required visibility of the landing runway of at least 50 m. For category 3C (cat IIIC), no visibility of the landing runway is required. Consequently, a cat IIIC approach makes it possible to make landings totally automatically, with no visibility of the landing runway. However, very few landing runways are equipped with ILS beacons that allow cat IIIC approaches, because, on the one hand, of the high accuracy demands of such beacons, of requirements relating to the terrain upstream of the runway threshold (small height difference, etc.) and of requirements relating to the lighting of the landing runway. In order to limit the workload of a pilot of an aircraft during the landing phases, it would be desirable for the aircraft to be able to land generally automatically, with or without visibility of the runway by the pilot, even on landing runways which are not provided for cat IIIC approaches, for example landing runways provided for cat I approaches.

SUMMARY OF THE INVENTION

An aim of the present invention is notably to provide a solution to this problem. It relates to a system for assisting in the landing of an aircraft on a landing runway of an airport according to a predetermined approach of the landing runway, the landing assistance system being noteworthy in that it comprises a processing unit configured to:

during a first phase of a landing runway approach procedure according to the predetermined approach, when the aircraft flies above a predetermined height with respect to a landing runway threshold:
  acquire information from a receiver of ILS guidance signals embedded onboard the aircraft;
  acquire aircraft position and speed information from a signal receiver of a satellite navigation system embedded onboard the aircraft;
  acquire aircraft position and speed information from an inertial unit embedded onboard the aircraft;
  determine so-called merged aircraft position and speed information as a function of the information from the receiver of ILS guidance signals and of the aircraft position and speed information from the signal receiver of a satellite navigation system;
  determine a bias of the position and speed information from the inertial unit, as a function of the merged position and speed information; and
  control the guiding of the aircraft on the basis of the information from the receiver of ILS guidance signals, then during a second phase of the landing runway approach procedure according to the predetermined approach, when the aircraft flies below the predetermined height with respect to the landing runway threshold:
  acquire aircraft position and speed information from the inertial unit;
  determine so-called adjusted aircraft position and speed information by applying, to the aircraft position and speed information from the inertial unit, a correction corresponding to the bias determined during the first phase of the approach procedure; and
  control the guiding of the aircraft along a landing runway approach axis corresponding to the predetermined approach, as a function of the adjusted position and speed information.

Thus, this system makes it possible to overcome the inaccuracies of the instrument landing ILS system when the aircraft flies below the predetermined height, chosen preferably to be at least equal to the decision height corresponding to the predetermined approach considered. In fact, according to the invention, below the predetermined height, the aircraft is guided only on the basis of information determined onboard the aircraft (adjusted information determined as a function of information from the inertial unit). The fact that information from a system external to the aircraft is not used makes it possible to overcome inaccuracies and failure modes of such a system external to the aircraft (an instrument landing system ILS or a satellite navigation system). The information from an inertial unit is known to drift with time. However, over a sufficient short duration, the drift of the information from the inertial unit can be considered negligible and this information has then a very high reliability and accuracy. Now, the duration of the second phase of the approach procedure, when the aircraft flies below the predetermined height, is sufficiently short for the drift of the information from the inertial unit to be considered negligible during this period. Furthermore, the determining of the bias of the position and speed information from the inertial unit as a function of the merged position and speed information makes it possible to determine this bias with a sufficient accuracy for the position and speed information from the inertial unit to be adjusted as a function of this bias, allowing for a sufficiently accurate guiding of the aircraft during the second phase of the approach procedure. In fact, this merged information is determined as a function of the information from the receiver of ILS guidance signals and of the aircraft position and speed information from the signal receiver of a satellite navigation system. Consequently, in the event of temporary inaccuracy of the information from the receiver of ILS guidance signals, for example in the case of multiple paths of the ILS signals, this inaccuracy is corrected by virtue of the aircraft position and speed information from the signal receiver of a satellite navigation system.

Advantageously, the processing unit is also configured to:
acquire information relating to the landing runway, from an airport database,
determine an orientation of the landing runway as a function of the information relating to the landing runway,
determine an orientation of a landing runway approach axis as a function of the aircraft position and speed information from the receiver of ILS guidance signals and of the aircraft position and speed information from the signal receiver of a satellite navigation system,
determine a deviation between the orientation of the landing runway and the orientation of the approach axis; and
determine the bias of the position and speed information from the inertial unit as a function, also, of the deviation.

In a particular embodiment, the processing unit is configured to control the guiding of the aircraft, during the first phase, on the basis of the information from the receiver of ILS guidance signals corrected of the deviation.

In a particular embodiment, the processing unit is configured to determine the merged aircraft position and speed information by means of at least one Kalman filter receiving as input at least the information from the receiver of ILS guidance signals and the aircraft position and speed information from the signal receiver of a satellite navigation system.

Advantageously, the processing unit is also configured to, during the second phase of the approach procedure, determine a current height of the aircraft with respect to the threshold of the landing runway and to transmit this current height of the aircraft to a guidance system of the aircraft to control a flare maneuver as a function of the current height.

Also advantageously, the processing unit is also configured to, during the first phase of the approach procedure, determine a current height of the aircraft with respect to the threshold of the landing runway and to transmit this current height to a guidance system of the aircraft to prepare a flare maneuver as a function of the current height.

Particularly, the processing unit is configured to determine the current height of the aircraft as a function of the slope of the approach axis and of a distance between a current height of the aircraft and the position of the runway threshold.

In one embodiment, the processing unit forms part of an avionics computer of the aircraft, in particular a flight control computer of the aircraft.

The invention also relates to a method for assisting in the landing of an aircraft on a landing runway of an airport according to a predetermined approach of the landing runway. This method is noteworthy in that it comprises the following steps implemented by a processing unit embedded onboard the aircraft:

during a first phase of a landing runway approach procedure according to the predetermined approach, when the aircraft flies above a predetermined height with respect to a landing runway threshold:
acquire information from a receiver of ILS guidance signals embedded onboard the aircraft;
acquire aircraft position and speed information from a signal receiver of a satellite navigation system embedded onboard the aircraft;
acquire aircraft position and speed information from an inertial unit embedded onboard the aircraft;
determine so-called merged aircraft position and speed information as a function of the information from the receiver of ILS guidance signals and of the aircraft position and speed information from the signal receiver of a satellite navigation system;
determine a bias of the position and speed information from the inertial unit, as a function of the merged position and speed information; and
control the guiding of the aircraft on the basis of the information from the receiver of ILS guidance signals, then during a second phase of the landing runway approach procedure according to the predetermined approach, when the aircraft flies below the predetermined height with respect to the landing runway threshold:
acquire aircraft position and speed information from the inertial unit;
determine so-called adjusted aircraft position and speed information by applying, to the aircraft position and speed information from the inertial unit, a correction corresponding to the bias determined during the first phase of the approach procedure; and
control the guiding of the aircraft along a landing runway approach axis corresponding to the predetermined approach, as a function of the adjusted position and speed information.

The invention also relates to an aircraft comprising a landing assistance system as cited above.

BRIEF DESCRIPTION OF THE DRAWINGS

The invention will be better understood on reading the following description and studying the attached figures.

DETAILED DESCRIPTION OF THE PREFERRED EMBODIMENTS

Figure 1:
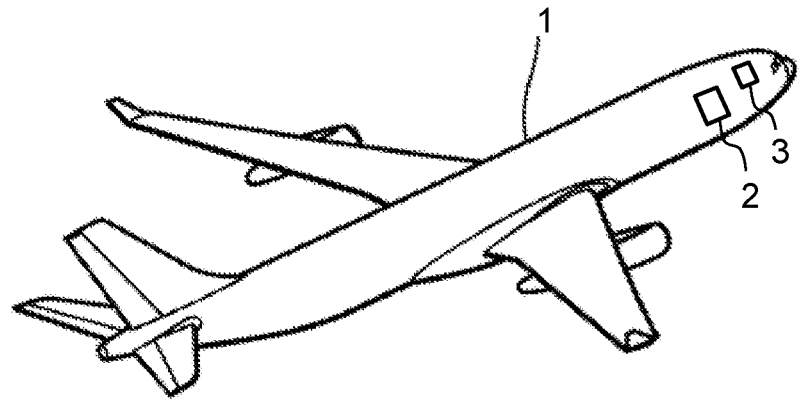
FIG. 1 is a view of an aircraft comprising a landing assistance system according to an embodiment of the invention.
Figure 2:
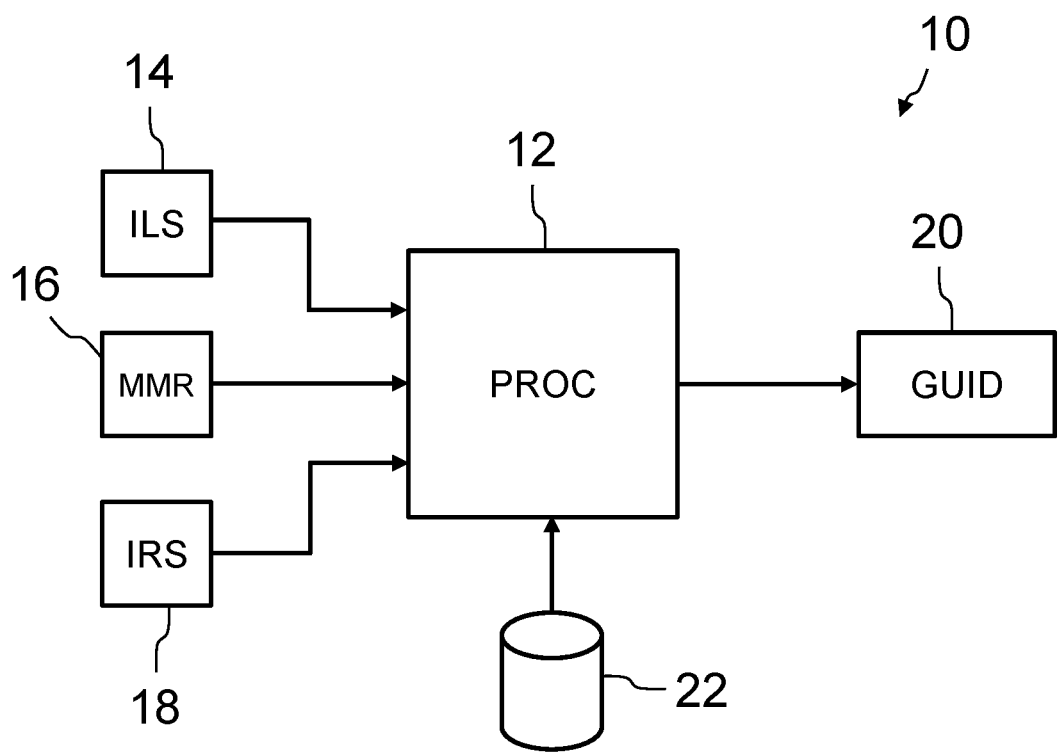
FIG. 2 schematically illustrates a landing assistance system according to an embodiment of the invention.

The landing assistance system 10 represented in FIG. 2 comprises a processing unit 12 (labelled PROC in FIG. 2), linked at the input to a receiver 14 of ILS signals embedded onboard the aircraft, to a receiver 16 of a satellite navigation system, for example a multimode receiver MMR, embedded onboard the aircraft and to an inertial unit 18 (labelled IRS in the figure, for "Inertial Reference System") embedded onboard the aircraft. The processing unit 12 is also linked to an airport database 22. The processing unit 12 is linked at the output to a guidance computer 20 of the aircraft (labelled GUID in the figure), for example a flight controls computer. The processing unit 12 preferably forms part of an avionics computer of the aircraft. This avionics computer is, for example, incorporated in an avionics bay 2, situated in proximity to a cockpit 3 of the aircraft 1 as represented in FIG. 1. The processing unit 12 comprises, for example, a microprocessor or a microcontroller. Advantageously, the avionics computer corresponds to a flight controls computer of the aircraft, such as the guidance computer 20. However, without departing from the scope of the invention, this avionics computer can also correspond to another computer of the aircraft, such as, for example, a modular avionics computer of IMA ("Integrated Modular Avionics") type. The receiver 16 of a satellite navigation system is, for example, a receiver of a system of GNSS ("Global Navigation Satellite System") type, for example of GPS ("Global Positioning System") type.

Figure 3:
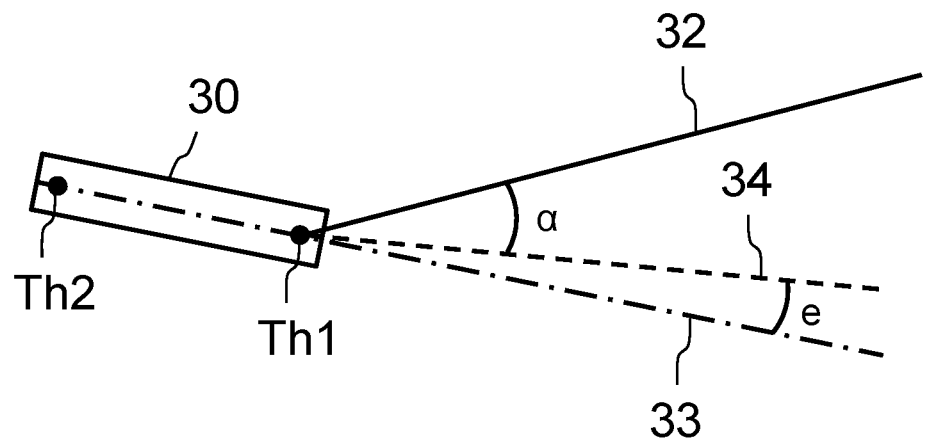
FIG. 3 is a perspective view of a landing runway and of an approach axis of the landing runway.

In operation, when a pilot of the aircraft wants to have the aircraft land on a landing runway of an airport such as the landing runway 30 represented in FIG. 3, generally, he or she selects a predetermined approach procedure for the landing runway by means of a human-machine interface of the cockpit of the aircraft, linked to a flight management computer of FMS type. The processing unit 12 receives information on the approach procedure selected by the pilot to land on the landing runway. In the approach to the landing runway by the aircraft, during a first phase of the landing runway approach procedure according to the predetermined approach selected by the pilot, when the aircraft flies above a predetermined height with respect to a landing runway threshold, the processing unit 12:

acquires information from the receiver 14 of ILS guidance signals;

acquires aircraft position and speed information from the signal receiver 16 of a satellite navigation system;

acquires aircraft position and speed information from the inertial unit 18;

determines so-called merged aircraft position and speed information as a function of the information from the ILS guidance signal receiver 14 and the aircraft position and speed information from the signal receiver 16 of a satellite navigation system;

determines a bias of the position and speed information from the inertial unit 18, as a function of the merged position and speed information;

controls the guiding of the aircraft, by the guidance computer 20, on the basis of the information from the ILS guidance signal receiver 14.

The ILS guidance signals received by the ILS guidance receiver 14 correspond to deviations between a current position of the aircraft and the approach axis 32 defined by the signals transmitted by the beacons of the ILS system. These deviations correspond to a current position of the aircraft. The aircraft position and speed information from the signal receiver 16 of a satellite navigation system correspond also to the current position of the aircraft. The processing unit 12 determines so-called merged aircraft position and speed information for example by means of a Kalman filter receiving as input, on the one hand, the deviations corresponding to the ILS guidance signals or a value of the current position determined as a function of the deviations and, on the other hand, the aircraft position and speed information from the signal receiver 16 of a satellite navigation system. The Kalman filter supplies as output the merged aircraft position and speed information. This merged aircraft position and speed information has a high level of accuracy and integrity. In fact, the ILS guidance signals allow an accurate guidance of the aircraft in the absence of any disturbance to the signals. However, they can be subject to disturbances, such as multiple paths, that may be due to reflections of the signals transmitted by the beacons of the ILS system. These reflections can for example originate from aircraft moving around on the airport or flying at low altitude in proximity to the airport. The fact that the information corresponding to the ILS guidance signals is merged with information from the signal receiver 16 of the satellite navigation system makes it possible to produce, as the output of the Kalman filter, merged information that is free of the effects of any disturbances to the ILS guidance signals such as the abovementioned multiple paths. That makes it possible to guarantee the high level of accuracy and integrity of the merged aircraft position and speed information.

The processing unit 12 which receives also the aircraft position and speed information from the inertial unit 18, determines the bias of the position and speed information from the inertial unit 18, as a function of the merged position and speed information. In a first exemplary embodiment, the bias is determined by calculating a difference between the merged aircraft position and speed information and the position and speed information from the inertial unit. In a second exemplary embodiment, the Kalman filter receives also as input the position and speed information from the inertial unit and it supplies the bias as output, the merged aircraft position and speed information then corresponding to internal variables of the Kalman filter. Preferably, the different steps of acquisition of information, of determination of the merged information and of determination of the bias are performed iteratively during the first phase of the approach procedure, for example according to a predetermined sampling frequency.

During a second phase of the landing runway approach procedure according to the predetermined approach, when the aircraft flies below the predetermined height with respect to the landing runway threshold, the processing unit 12:

acquires aircraft position and speed information from the inertial unit 18;

determines so-called adjusted aircraft position and speed information by applying, to the aircraft position and speed information from the inertial unit, a correction corresponding to the bias determined during the first phase of the approach procedure;

controls the guiding of the aircraft, by the guidance computer 20, along an approach axis of the landing runway corresponding to the predetermined approach, as a function of the adjusted position and speed information. The approach axis used by the processing unit 12 to control the guiding of the aircraft is determined by the processing unit 12 as a function of information from the airport database 22. The origin of this approach axis is the runway threshold Th1 whose position is acquired by the processing unit 12 from the airport database 22. The slope and orientation of the approach axis are also acquired from the airport database 22. The processing unit 12 calculates lateral and vertical deviations between the adjusted position of the aircraft and the approach axis and it controls the guiding of the aircraft as a function of the deviations.

The predetermined height value is for example at least equal to a decision height published for the approach procedure considered. For example, for an approach procedure of Cat I type, the predetermined height is at least equal to 200 ft (approximately 60 m). Thus, when the aircraft descends below the decision height during the landing runway approach, it is guided as a function of the adjusted position and speed information. That then makes it possible to avoid having the aircraft guided as a function of information originating from a system external to the aircraft, likely to be subject to disturbances such as multiple paths, since such adjusted information is determined as a function of the information from the inertial unit 18 embedded onboard the aircraft. Thus, even if the guidance system with which the landing runway is equipped is of a category not allowing an automatic landing without visibility of the landing runway, the system 10 according to the invention allows the aircraft to follow the approach axis with sufficient accuracy and integrity to perform such an automatic landing with or without visibility of the landing runway.

Advantageously, during the first phase of the approach procedure, the processing unit further acquires information relating to the landing runway, from the airport database 22. In particular, this information comprises two runway thresholds Th1 and Th2 corresponding to two opposite ends of the landing runway 30. The processing unit determines an orientation of the landing runway as a function of the information relating to the landing runway. This orientation corresponds for example to the orientation of a straight line 33 passing through the two runway thresholds Th1 and Th2. Also, the processing unit further determines an orientation of an approach axis 32 of the landing runway as a function of the aircraft position and speed information from the ILS guidance signal receiver 14 and of the aircraft position and speed information from the signal receiver 16 of a satellite navigation system. Advantageously, the orientation of the approach axis is determined by projection 34 in a horizontal plane. The approach axis 32 forms an angle α with respect to its projection 34 in the horizontal plane, this angle α corresponding to the slope published for the approach procedure considered. The approach axis 32 is the approach axis corresponding to the ILS guidance system, defined by the signals transmitted by the beacons of the ILS guidance system. The processing unit 12 determines a deviation e between the orientation 33 of the landing runway and the orientation 34 of the approach axis. Although not mandatorily, the deviation e is for example defined in the form of an angular deviation. Such a deviation can notably be non-zero when the constraints of locating the beacons on the ground impose locating the beacon transmitting the signals corresponding to the LOC signal with lateral deviation from the landing runway 30. The processing unit 12 then determines the bias of the position and speed information from the inertial unit 18 as a function, also, of the deviation e.

In a particular embodiment, the processing unit 12 controls the guiding of the aircraft, during the first phase, on the basis of the information from the ILS guidance signal receiver 14 corrected of the deviation e. That thus makes it possible to guide the aircraft in the alignment of the landing runway 30, by being clear of the deviation e between the orientation 33 of the landing runway and the projection 34 of the approach axis corresponding to the ILS guidance system.

In one embodiment, the processing unit 12 determines a current height of the aircraft with respect to the threshold Th1 of the landing runway. Advantageously, during the first phase of the approach procedure, the processing unit transmits this current height of the aircraft to the guidance computer 20, so as to allow the guidance computer to prepare a flare maneuver with a view to setting the wheels of the aircraft on the landing runway, as a function of the current height. Such a flare maneuver is called, simply, "flare." Also advantageously, during the second phase of the approach procedure, the processing unit transmits this current height of the aircraft to the guidance computer 20, so as to allow the guidance computer to control a flare maneuver with a view to setting the wheels of the aircraft on the landing runway, as a function of the current height. This current height is sufficiently accurate to allow the guidance computer to prepare and control the flare maneuver, before the aircraft arrives at the runway threshold. However, when the aircraft arrives at the runway threshold, the guidance computer 20 uses height information from a radio altimeter embedded onboard the aircraft. In fact, to control the setting of the wheels of the aircraft on the landing runway, the guidance computer 20 requires the most accurate possible height information. Now, when the aircraft is above the landing runway, the height information from the radio altimeter is more accurate than the current height determined by the processing unit 12.

Figure 4:
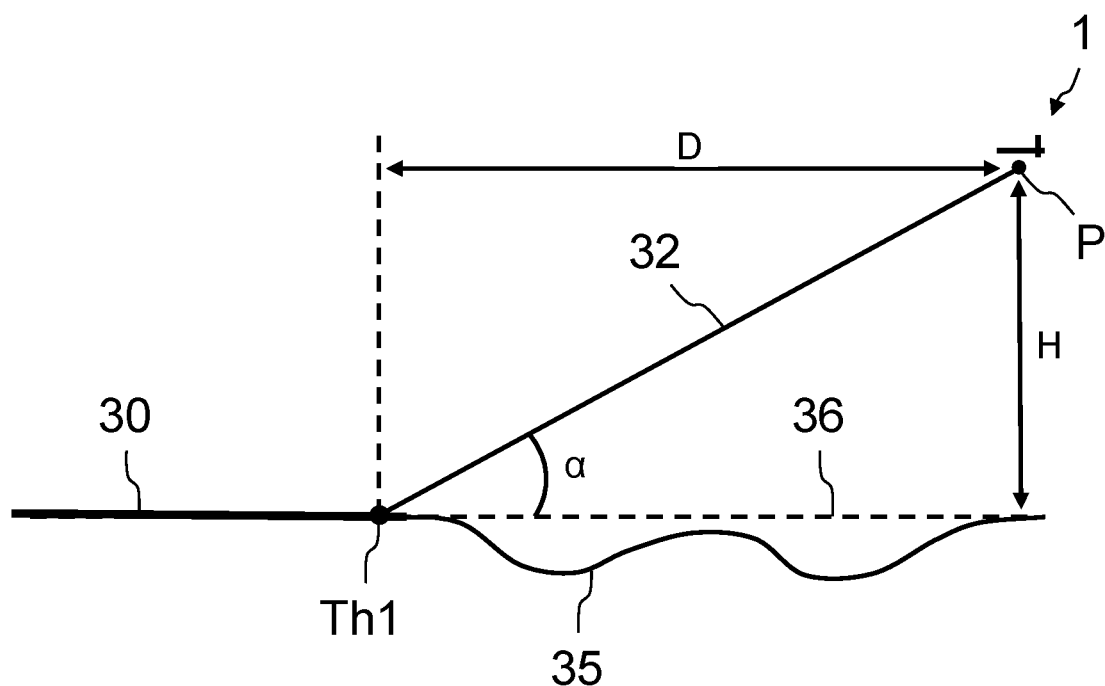
FIG. 4 is a cross-sectional view, on a vertical plane, of a landing runway and of an approach axis of the landing runway.

In a particular embodiment, the processing unit 12 determines the current height of the aircraft with respect to the threshold Th1 of the landing runway as a function of the slope α of the approach axis 32 and of a distance between a current position of the aircraft and the position of the runway threshold. For that, in an example illustrated by FIG. 4, the processing unit calculates a distance D between a current position P of the aircraft 1 and the position of the runway threshold Th1. The distance D is preferably calculated by projection in a horizontal plane. The value of the current position P of the aircraft is for example received from the receiver 16 of the satellite navigation system (in particular during the first phase of the approach procedure), or from the inertial unit 18 (in particular during the second phase of the approach procedure). The value of the position of the runway threshold Th1 is, for example, acquired from the airport database 22. Knowing the slope α of the approach axis 32, the current height H of the aircraft with respect to the runway threshold Th1 (whose altitude is illustrated by the broken line 36) is then calculated by using the following formula:

$$H = D \times \tangent(\alpha)$$

Advantageously, during the first phase of the approach procedure, the processing unit corrects this current height value as a function of an angular value α1 corresponding to a deviation with respect to the vertical guidance Glide signal, received from the ILS guidance signal receiver 14. That makes it possible to take account of the aircraft position error with respect to the approach axis. The current height of the aircraft is then calculated according to the formula:

$$H = D \times \tangent(\alpha + \alpha 1)$$

According to a first variant, the slope angle α of the approach axis is chosen arbitrarily to be equal to 3°. This value corresponds to the slope of most published approaches. Furthermore, for the approaches that have a different slope, the corresponding angle is around 3° to within a few tenths of a degree. The angular error is therefore minimal. Furthermore, since this error is angular, its effect on the value of the current height H decreases as the aircraft approaches the landing runway.

According to a second variant, the processing unit 12 acquires the value of the angle α from the airport database 22. This value then corresponds to the published value of the slope of the approach axis.

According to a third variant, approach angle values are stored in the processing unit 12, for a set of landing runway approaches frequently used by the airline operating the aircraft. The angle α is then read by the processing unit 12 in its memory, for the approach considered. This variant makes it possible to use a precise value of the angle α, dispensing with any problems of integrity of the airport database 22.

The current height H has the advantage, with respect to the current height measured by means of a radio altimeter embedded onboard the aircraft, of being referenced with respect to the altitude of the runway threshold Th1 (illustrated by the line 36) and not with respect to the terrain 35 flown over by the aircraft (as in the case of a radio altimeter). In fact, the use of aircraft height information with respect to the terrain, measured by a radio altimeter, is not optimal for performing a flare maneuver because this information depends on the terrain flown over by the aircraft. That restricts the number of landing runways on which the flare maneuver can be controlled automatically, by excluding landing runways for which the relief of the terrain 35 upstream of the runway is irregular. The use of the abovementioned current height H to perform a flare maneuver makes it possible to overcome the abovementioned problem and therefore automatically control a flare maneuver regardless of the relief upstream of the landing runway.

Also, the current height H determined by the processing unit 12 also offers the advantage, with respect to a barometric height determined onboard the aircraft, of being insensitive to the outside conditions (temperature, pressure, etc.). In a particular embodiment, the barometric height of the aircraft is used for monitoring the current height H.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for assisting in the landing of an aircraft on a landing runway of an airport according to a predetermined approach of said landing runway, said landing assistance system comprising a processing unit configured to:
   during a first phase of a landing runway approach procedure according to said predetermined approach, when the aircraft flies above a predetermined height with respect to a landing runway threshold:
      acquire information from a receiver of ILS guidance signals embedded onboard the aircraft;
      acquire aircraft position and speed information from a signal receiver of a satellite navigation system embedded onboard the aircraft;
      acquire aircraft position and speed information from an inertial unit embedded onboard the aircraft;
      determine merged aircraft position and speed information as a function of said information from the receiver of ILS guidance signals and said aircraft position and speed information from the signal receiver of a satellite navigation system;
      determine a bias of the aircraft position and speed information from the inertial unit as a function of said merged aircraft position and speed information by calculating a difference between said merged aircraft position and speed information and said position and speed information from the inertial unit; and
      control a guiding of the aircraft based on the information from the receiver of ILS guidance signals, then:
   during a second phase of the landing runway approach procedure according to said predetermined approach, when the aircraft flies below said predetermined height with respect to the landing runway threshold:
      acquire aircraft position and speed information from the inertial unit;
      determine adjusted aircraft position and speed information by applying, to the aircraft position and speed information from the inertial unit, a correction corresponding to the bias determined during the first phase of the approach procedure; and
      control the guiding of the aircraft along a landing runway approach axis corresponding to said predetermined approach, as a function of said adjusted position and speed information.

2. The system according to claim 1, wherein the processing unit is also configured to:
   acquire information relating to the landing runway, from an airport database,
   determine an orientation of the landing runway as a function of said information relating to the landing runway,
   determine an orientation of a landing runway approach axis as a function of the aircraft position and speed information from the receiver of ILS guidance signals and from the aircraft position and speed information from the signal receiver of a satellite navigation system,
   determine a deviation between said orientation of the landing runway and said orientation of the approach axis; and
   determine the bias of the position and speed information from the inertial unit as a function, also, of said deviation.

3. The system according to claim 2, wherein the processing unit is configured to control the guiding of the aircraft, during the first phase, based on the information from the receiver of ILS guidance signals corrected of said deviation.

4. The system according to claim 1, wherein the processing unit is configured to determine said merged aircraft position and speed information by means of at least one Kalman filter receiving as input at least said information from the receiver of ILS guidance signals and said aircraft position and speed information from a signal receiver of a satellite navigation system.

5. The system according to claim 1, wherein the processing unit is also configured to, during the second phase of the approach procedure, determine a current height of the aircraft with respect to the threshold of the landing runway and to transmit the current height of the aircraft to a guidance system of the aircraft to control a flare maneuver as a function of said current height.

6. The system according to claim 5, wherein the processing unit is configured to determine the current height of the aircraft as a function of a slope of the approach axis and of a distance between a current position of the aircraft and the position of the runway threshold.

7. The system according to claim 1, wherein the processing unit is also configured to, during the first phase of the approach procedure, determine a current height of the aircraft with respect to the threshold of the landing runway and to transmit this current height to a guidance system of the aircraft to prepare a flare maneuver as a function of said current height.

8. The system according to claim 7, wherein the processing unit is configured to determine the current height of the aircraft as a function of a slope of the approach axis and of a distance between a current position of the aircraft and the position of the runway threshold.

9. The system according to claim 1, wherein the processing unit forms part of an avionics computer of the aircraft.

10. The system according to claim 9, wherein the avionics computer comprises a flight controls computer of the aircraft.

11. A method for assisting in a landing of an aircraft on a landing runway of an airport according to a predetermined approach of said landing runway, comprising the following steps implemented by a processing unit embedded onboard the aircraft:

during a first phase of a landing runway approach procedure according to said predetermined approach, when the aircraft flies above a predetermined height with respect to a landing runway threshold:

acquiring information from a receiver of ILS guidance signals embedded onboard the aircraft;

acquiring aircraft position and speed information from a signal receiver of a satellite navigation system embedded onboard the aircraft;

acquiring aircraft position and speed information from an inertial unit embedded onboard the aircraft;

determining merged aircraft position and speed information as a function of said information from the receiver of ILS guidance signals and of said aircraft position and speed information from the signal receiver of a satellite navigation system;

determining a bias of the aircraft position and speed information from the inertial unit, as a function of said merged aircraft position and speed information by calculating a difference between said merged aircraft position and speed information and said position and speed information from the inertial unit; and controlling a guiding of the aircraft based on the information from the receiver of ILS guidance signals, then:

during a second phase of the landing runway approach procedure according to said predetermined approach, when the aircraft flies below said predetermined height with respect to the landing runway threshold:

acquiring aircraft position and speed information from the inertial unit;

determining adjusted aircraft position and speed information by applying, to the aircraft position and speed information from the inertial unit, a correction corresponding to the bias determined during the first phase of the approach procedure; and controlling the guiding of the aircraft along a landing runway approach axis corresponding to said predetermined approach, as a function of said adjusted position and speed information.

12. An aircraft, comprising a landing assistance system according to claim 1.

* * * * *